(12) United States Patent
Yoon

(10) Patent No.: US 7,872,724 B2
(45) Date of Patent: Jan. 18, 2011

(54) COLOR FILTER SUBSTRATE AND LIQUID CRYSTAL DISPLAY PANEL COMPRISING THE SAME

(75) Inventor: Yeo-Geon Yoon, Asan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1017 days.

(21) Appl. No.: 11/620,409

(22) Filed: Jan. 5, 2007

(65) Prior Publication Data

US 2007/0159588 A1    Jul. 12, 2007

(30) Foreign Application Priority Data

Jan. 11, 2006    (KR) ...................... 10-2006-0002982

(51) Int. Cl.
*G02F 1/1339*    (2006.01)
(52) U.S. Cl. ...................................................... 349/156
(58) Field of Classification Search .................. 349/156
See application file for complete search history.

(56) References Cited

U.S. PATENT DOCUMENTS

| 5,748,266 | A | * | 5/1998 | Kodate | ........................ 349/39 |
| 5,966,190 | A | * | 10/1999 | Dohjo et al. | .................. 349/39 |
| 6,583,846 | B1 | * | 6/2003 | Yanagawa et al. | ........... 349/155 |
| 6,678,030 | B2 | * | 1/2004 | Imabayashi et al. | ......... 349/155 |

* cited by examiner

*Primary Examiner*—James A Dudek
(74) *Attorney, Agent, or Firm*—H.C. Park & Associates, PLC

(57) ABSTRACT

A color filter substrate having a conductive column spacer and a liquid crystal display panel including the color filter substrate. The color filter substrate includes a transparent insulating substrate, a black matrix arranged on the substrate to block light, a plurality of color filters arranged on the substrate and the black matrix, an overcoat layer arranged on the color filters, a first column spacer arranged on the overcoat layer to maintain a liquid crystal cell gap, and a common electrode arranged on the overcoat layer and the first column spacer. The first column spacer is arranged in a display area of the substrate.

11 Claims, 9 Drawing Sheets

I
COLOR FILTER SUBSTRATE AND LIQUID CRYSTAL DISPLAY PANEL COMPRISING THE SAME

CROSS REFERENCE TO RELATED APPLICATION

This application claims priority to and the benefit of Korean Patent Application No. 10-2006-0002982, filed on Jan. 11, 2006, which is hereby incorporated by reference for all purposes as if fully set forth herein.

BACKGROUND OF THE INVENTION

1. Field of the Invention

The present invention relates to a color filter substrate and a liquid crystal display panel comprising the same, and more particularly, to a color filter substrate including a conductive column spacer.

2. Discussion of the Background

Since a liquid crystal display (LCD) has advantages over a conventional cathode ray tube (CRT), such that it may be thinner and lighter while having a larger screen, it has been widely developed. Further, since the LCD has been used in laptop and desktop computers, large-sized displays and mobile communication devices, its use has rapidly spread. Generally, an LCD adjusts an amount of light transmitted in accordance with image signals applied to control switches arrayed in a matrix to display a desired image on an LCD panel.

FIG. 1 is an equivalent circuit diagram of a unit pixel in a general LCD. Referring to FIG. 1, the unit pixel includes a thin film transistor (TFT) 13 serving as a switching element, a pixel electrode 14 for applying a voltage to a liquid crystal, and a storage capacitor Cs for maintaining the level of a liquid crystal voltage for a period of one frame. In such an LCD, when applying a gate drive voltage to a selected gate line 11, the TFT 13 connected to the gate line 11 turns on. At this time, a data voltage Vd is applied to the pixel electrode 14 while being charged to a liquid crystal cell capacitor $C_{lc}$ and the storage capacitor $C_s$ through the TFT via a data line 12. The pixel electrode is maintained at the data voltage level until it is refreshed in the next frame.

FIG. 2A is a schematic sectional view of a conventional color filter substrate, and FIG. 2B is a schematic sectional view of a conventional LCD. Referring to FIG. 2A, a black matrix 22 is formed on an insulating transparent substrate 21. Red (R), blue (B) and green (G) color filters 23 are formed on the black matrix 22, and an overcoat layer 24 is formed on the color filters 23. A common electrode 25 is formed on the overcoat layer 24, and column spacers 26, which maintain a liquid crystal cell gap, are formed at a predetermined interval on the common electrode 25.

Referring to FIG. 2B, the color filter substrate of FIG. 2A is shown coupled with a thin film transistor substrate. The thin film transistor substrate includes a thin film transistor, a storage electrode 33, and a pixel electrode 39, and the column spacers 26 are disposed between the color filter substrate and the thin film transistor substrate to maintain the liquid crystal cell gap.

In such an LCD, a voltage (hereinafter, referred to as a common voltage) may be applied to the common electrode 25 of the color filter substrate through a short (not shown) formed at an edge of the thin film transistor substrate. Further, a voltage (hereinafter, referred to as a storage capacitor voltage) may be applied to the storage electrode 33 of the thin film transistor substrate through a storage electrode line coupled with the storage electrode 33 at the left and right sides of the thin film transistor substrate. As described above, since the common voltage and the storage capacitor voltage may be applied at peripheral portions of a substrate, their values at the edge of the substrate may differ from their values at the center of the substrate. Accordingly, problems such as a greenish color being displayed, flicker, and horizontal crosstalk may occur.

FIG. 3A is a diagram showing a conventional inversion driving method of unit pixels of the LCD, and FIG. 3B is a diagram showing a greenish color that may be displayed at the center of the LCD. FIG. 3A shows a 2×1 inversion driving method for inverting the polarity every two gate line selections, and FIG. 3B shows the greenish colored display occurring at the center of the LCD driven by 2×1 inversion driving. This problem typically occurs due to a large variation between the common voltage and the storage capacitor voltage at the center of the substrate.

SUMMARY OF THE INVENTION

The present invention provides a color filter substrate having a conductive column spacer for minimizing a variation in common voltage and a variation in storage capacitor voltage across the substrate and also for minimizing a variation between the common voltage and the storage capacitor voltage at the center of the substrate.

Additional features of the invention will be set forth in the description which follows, and in part will be apparent from the description, or may be learned by practice of the invention.

The present invention discloses a color filter substrate that includes a substrate, a black matrix arranged on the substrate, a plurality of color filters arranged on the substrate and the black matrix, an overcoat layer arranged on the color filters, a first column spacer arranged on the overcoat layer to maintain a liquid crystal cell gap, and a common electrode arranged on the overcoat layer and the first column spacer. The first column spacer is arranged in a display area of the substrate.

The present invention also discloses a color filter substrate that includes a substrate, a black matrix arranged on the substrate, a plurality of color filters arranged on the substrate and the black matrix, a common electrode arranged on an entire surface of the plurality of color filters, and a first column spacer arranged on the common electrode to maintain a liquid crystal cell gap. The first column spacer is formed of a conductive material and is arranged in a display area of the substrate.

The present invention also discloses a LCD panel that includes a first substrate including a first conductive column spacer, a second substrate opposing the first substrate, and a liquid crystal arranged between the first and second substrates. The first conductive column spacer is arranged in a display area of the first substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DESCRIPTION OF THE ILLUSTRATED EMBODIMENTS

Figure 1:
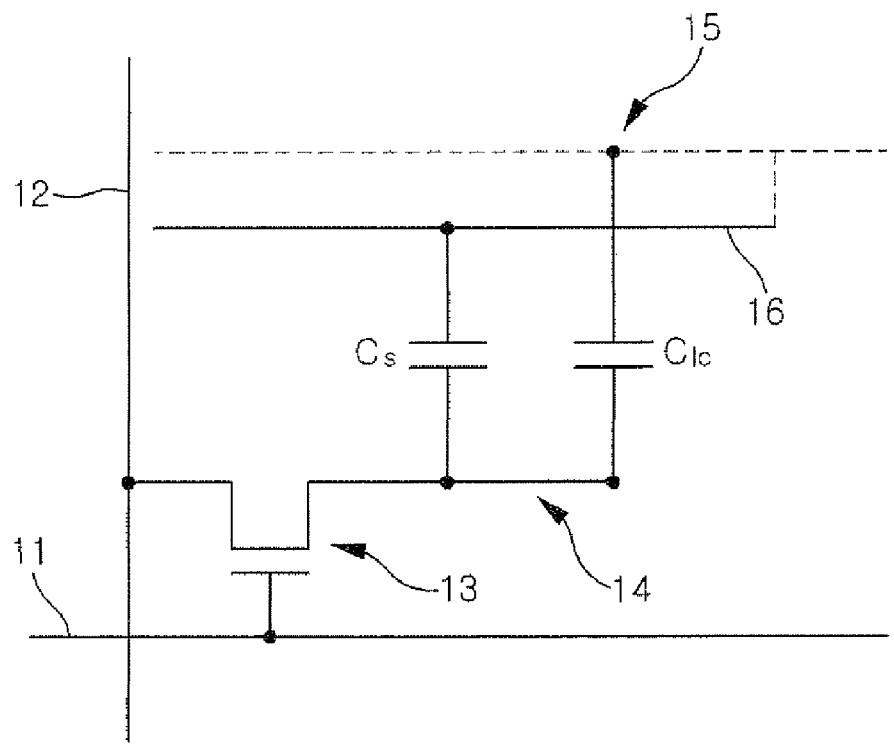
FIG. 1 is an equivalent circuit diagram of a unit pixel in a general LCD.
Figure 2A:
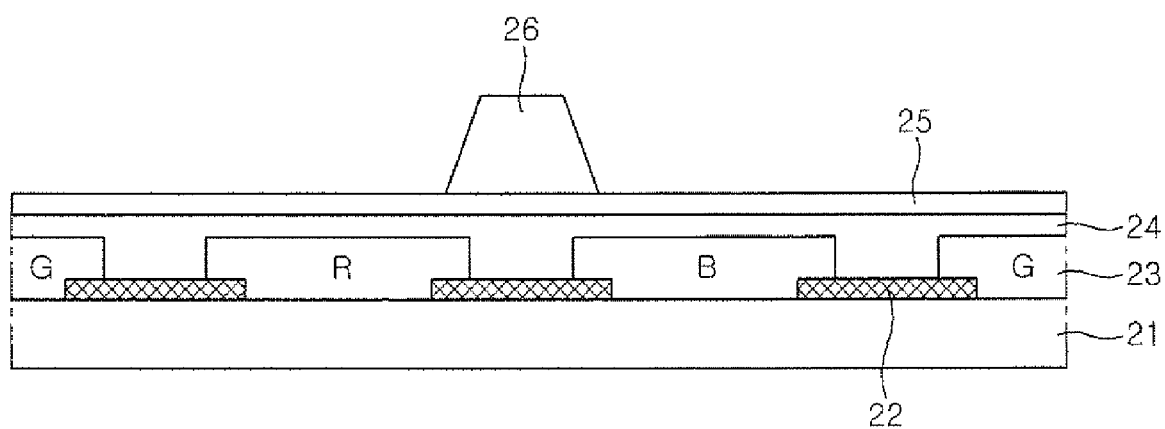
FIG. 2A is a schematic sectional view of a conventional color filter substrate.
Figure 2B:
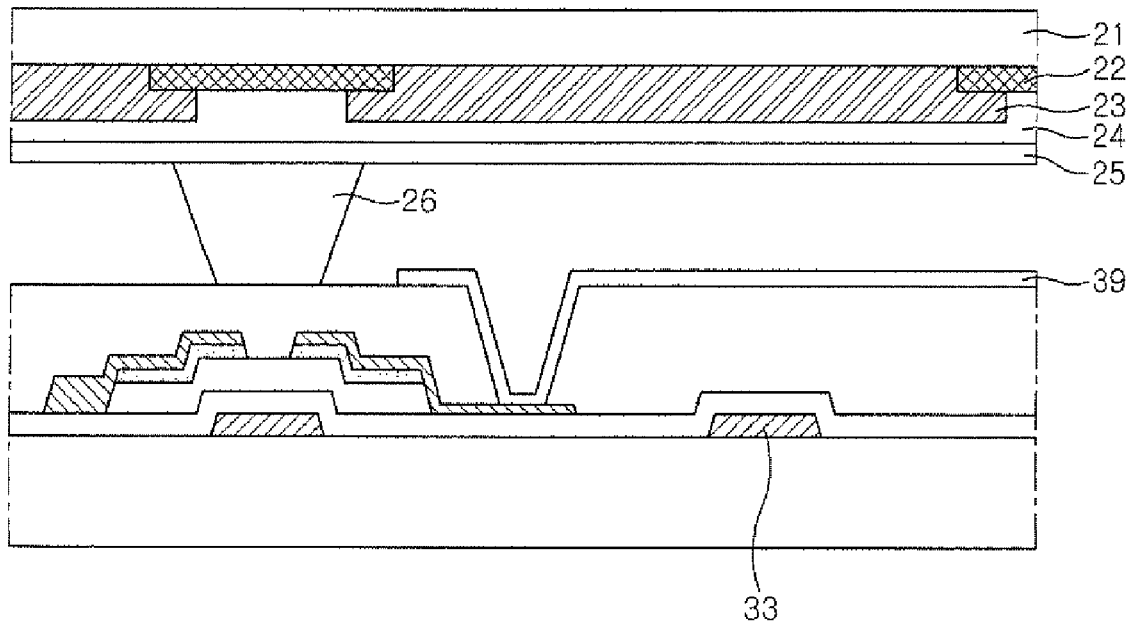
FIG. 2B is a schematic sectional view of a conventional LCD.
Figure 3A:
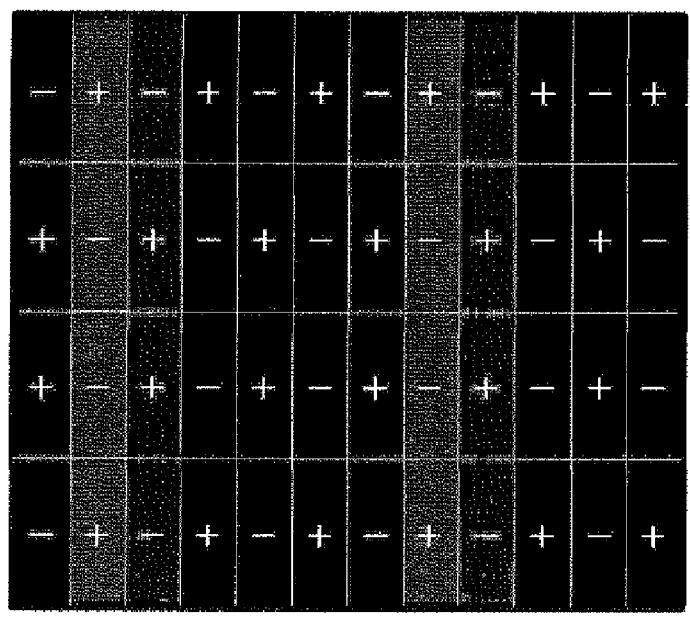
FIG. 3A is a diagram showing the inversion driving of a unit pixel of the LCD according to a prior art.
Figure 3B:
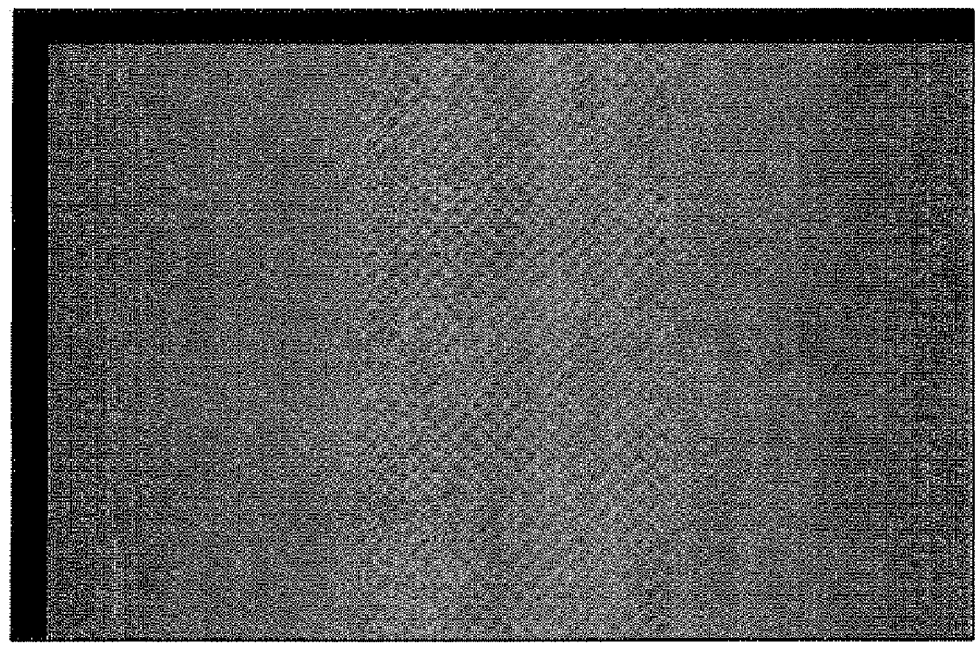
FIG. 3B is a diagram illustrating a greenish phenomenon occurring at the center of the LCD.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" another element, it can be directly on the other element or intervening elements may also be present. In contrast, when an element is referred to as being "directly on" another element, there are no intervening elements present.

FIG. 4A, FIG. 4B, FIG. 4C, FIG. 4D, and FIG. 4E are sectional views showing a process of fabricating a color filter substrate according to an exemplary embodiment of the present invention.

Figure 4A:
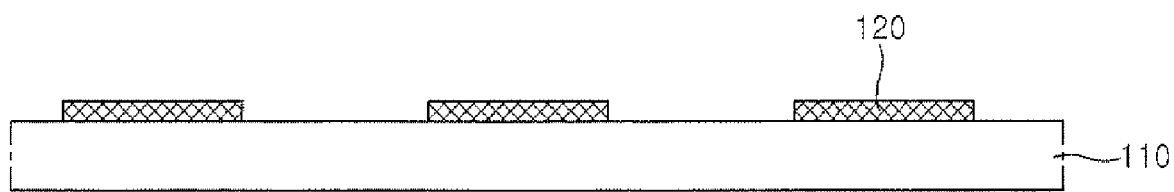
FIG. 4A, FIG. 4B, FIG. 4C, FIG. 4D, and FIG. 4E are sectional views showing a process of fabricating a color filter substrate according to an exemplary embodiment of the present invention.

Referring to FIG. 4A, a black matrix 120 may be formed on a substrate 110. The substrate 110 may be a transparent, insulating substrate, such as a glass substrate, and the black matrix 120 may be made of a thin metal film such as chromium or a carbon based organic material. Further, the black matrix 120 may be formed in the vicinity of the pixel boundaries to separate color filters from one another and to block light that may penetrate a liquid crystal cell positioned at an area that is not controlled by a pixel electrode, so that the LCD's contrast ratio may be improved.

Figure 4B:
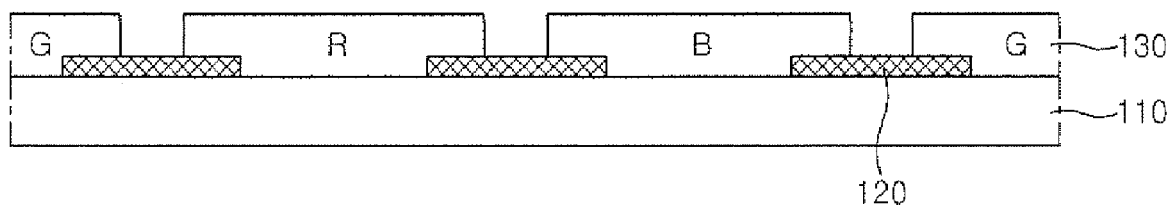

Referring to FIG. 4B, a plurality of color filters 130, such as red (R), blue (B) and green (G) color filters, are formed on the substrate 110 having the black matrix 120.

The color filters 130 may be constructed using the following process. A negative color photoresist with a red colorant dispersed therein may be applied onto the substrate and then exposed to light using a mask. At this time, an area of the mask below which the red color filter will be formed is opened and then exposed to the light. Subsequently, if the negative color photoresist is developed using a developing solution, a photopolymerization initiator on the exposed area reacts with the developing solution to form a polymer. Thus, the polymer is not removed during the development, and a pattern of the polymer remains. Consequently, only the non-exposed area is removed during development, thereby forming the red color filter on the substrate. The aforementioned processes may be repeated to form the blue and green color filters on the substrate.

Figure 4C:
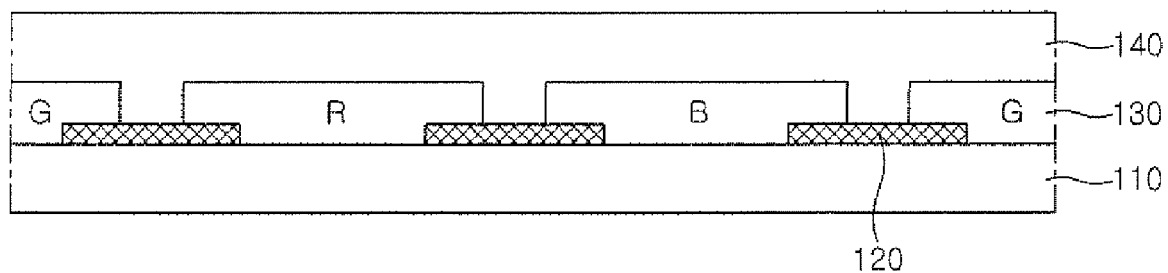

Referring to FIG. 4C, an overcoat layer 140 may be formed on the plurality of color filters 130. The overcoat layer 140 provides improved step coverage for forming a common electrode, as described below, and it may be formed by coating an acrylic resin or the like on the color filters 130.

Figure 4D:
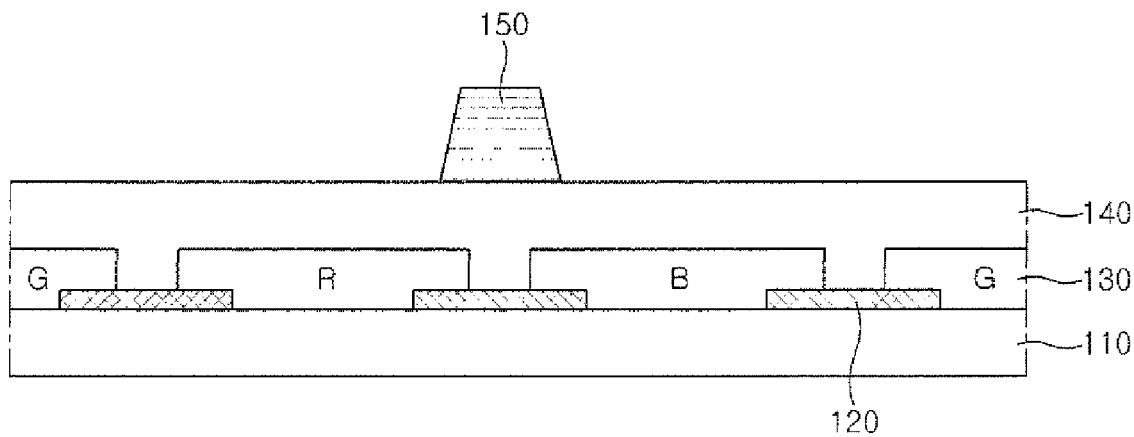

Referring to FIG. 4D, column spacers 150, which maintain a liquid crystal cell gap, may be formed on the overcoat layer 140. The column spacers 150 may be arranged at regular intervals on the color filter substrate in areas corresponding to the black matrix 120. According to an exemplary embodiment of the present invention, the column spacers 150 may be formed at regular intervals in a display area of the LCD panel. Here, the display area of the LCD panel refers to an area of the panel in which an image is displayed when driving the panel.

A process of forming the column spacers 150 will be discussed below. An organic insulating film may be applied on the overcoat layer 140, and a photolithographic process using a column spacer forming mask may then be performed to form the column spacers 150.

Figure 4E:
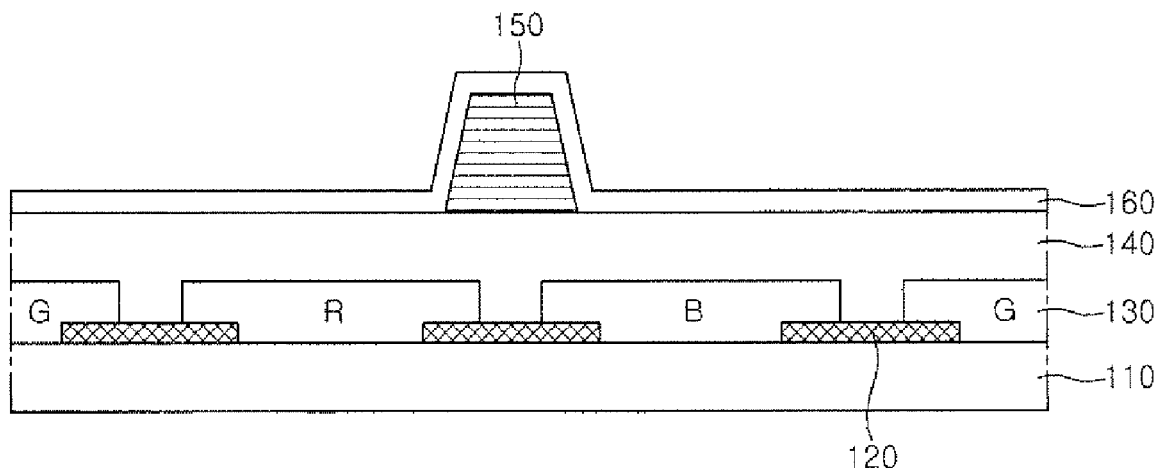

Referring to FIG. 4E, a transparent conductive layer serving as a common electrode 160 may be formed on the entire surface of the overcoat layer 140 and the column spacer 150 through a sputtering method or the like. The common electrode 160 may be formed of a material such as indium tin oxide (ITO) or indium zinc oxide (IZO).

According to the above process of fabricating the color filter substrate, since the common electrode 160 is formed on the column spacer 150, the column spacer 150 including the common electrode 160 may be conductive.

Figure 5:
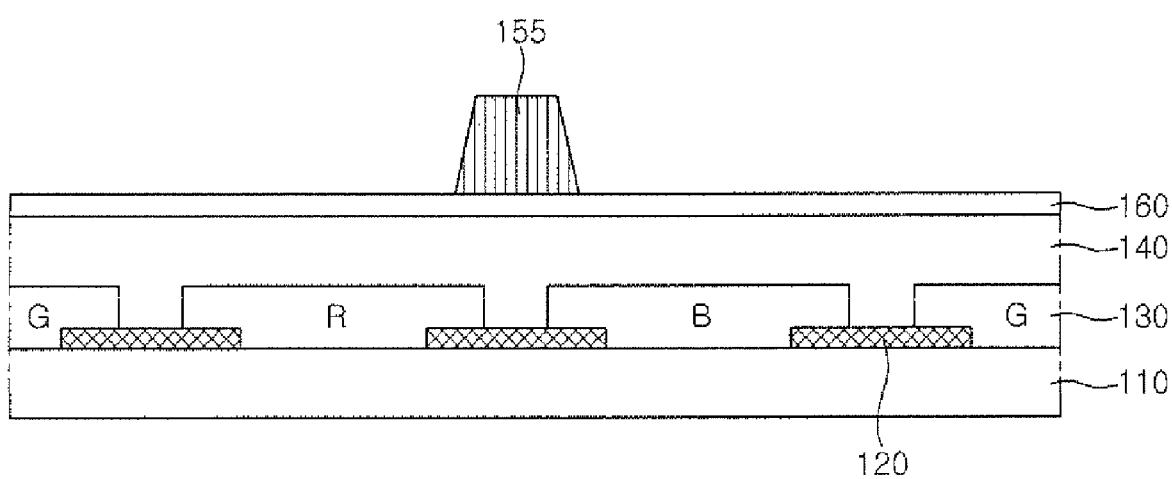
FIG. 5 is a sectional view of a color filter substrate according to another exemplary embodiment of the present invention.

FIG. 5 is a sectional view of a color filter substrate according to another exemplary embodiment of the present invention.

Referring to FIG. 5, the color filter substrate includes a transparent insulating substrate 110, a black matrix 120, a plurality of color filters 130, an overcoat layer 140, a column spacer 155, and a common electrode 160.

The black matrix 120 may be formed on the transparent insulating substrate 110, e.g. a glass substrate. Further, the plurality of color filters 130, e.g. R, B, and G color filters, may be formed on the substrate 110 having the black matrix 120. The overcoat layer 140 may then be formed on the color filters 130, and a transparent conductive layer serving as the common electrode 160 may be formed on the entire surface of the overcoat layer 140 through a sputtering method or the like. The common electrode 160 may be formed of a material such as ITO or IZO.

The column spacers 155, which maintain a liquid crystal cell gap, may be formed on the common electrode 160. In this case, the column spacer 155 may include a conductive material. The column spacers 155 may be arranged at regular intervals on the color filter substrate in areas corresponding to the black matrix 120. According to an exemplary embodiment of the present invention, the column spacers 155 may be formed at regular intervals in the display area of the LCD panel.

Figure 6A:
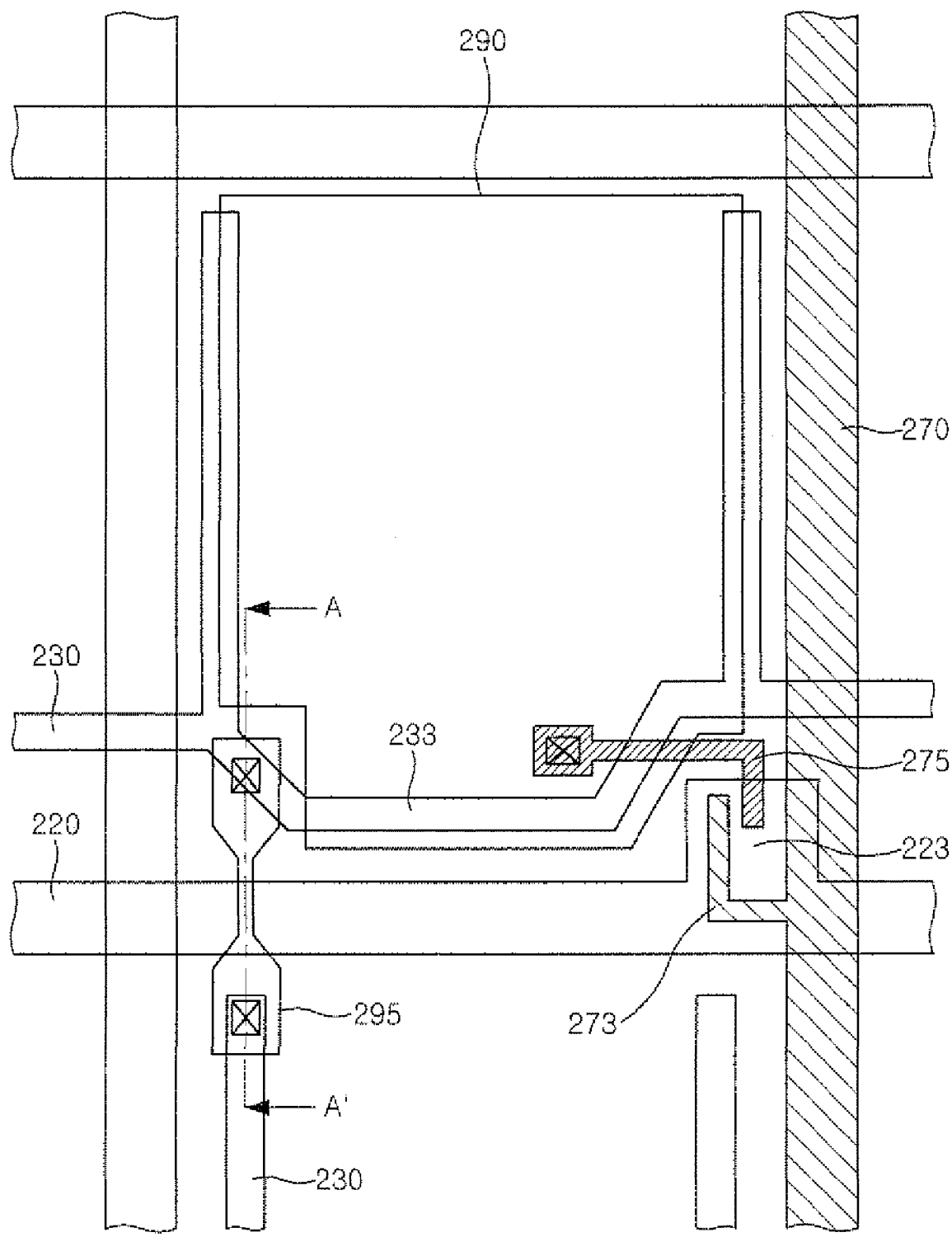
FIG. 6A is a schematic plan view of a thin film transistor substrate of the LCD panel according to an exemplary embodiment of the present invention.
Figure 6B:
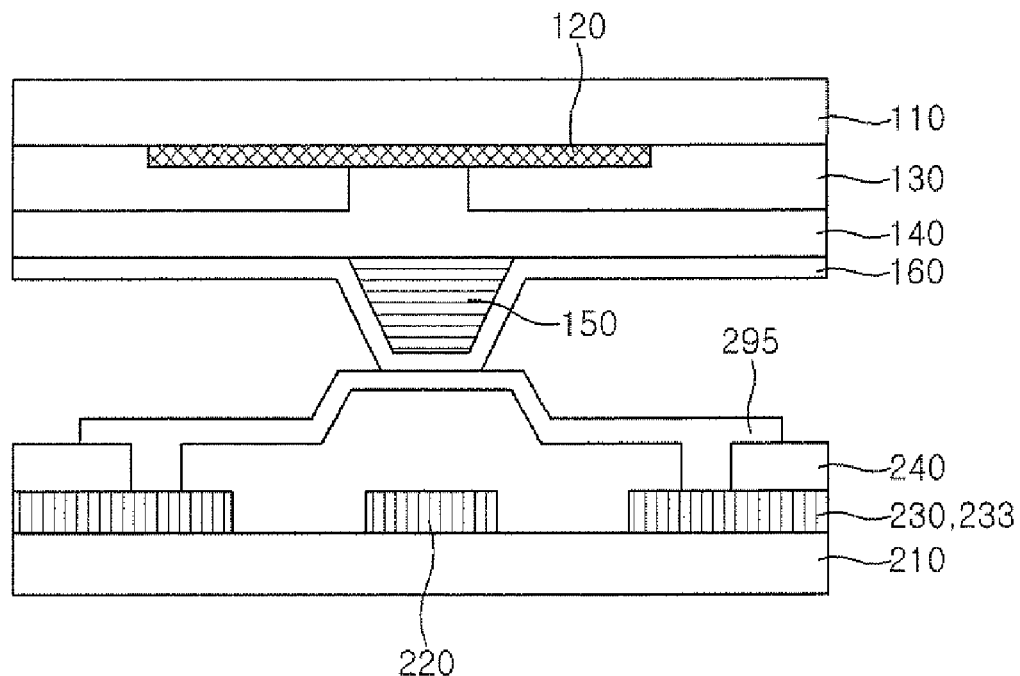
FIG. 6B and FIG. 6C are schematic sectional views of the LCD panel taken along line A-A' of FIG. 6A.
Figure 6C:
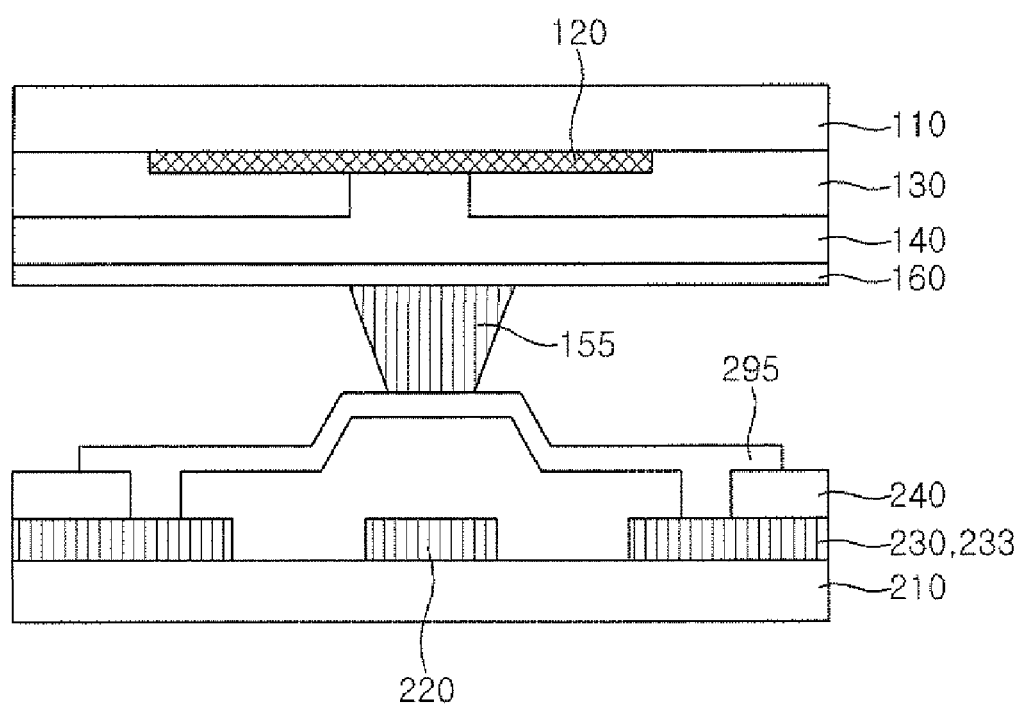

FIG. 6A is a schematic plan view of a thin film transistor substrate of an LCD panel according to an exemplary embodiment of the present invention, and FIG. 6B and FIG. 6C are schematic sectional views of the LCD panel taken along line A-A' of FIG. 6A.

Referring to FIG. 6A, the thin film transistor substrate includes a plurality of gate lines 220 extending in a first direction and arranged at a predetermined interval on the transparent insulating substrate to transmit a gate signal, a plurality of data lines 270 formed across and electrically isolated from the gate lines 220, a pixel electrode 290 formed on a pixel area defined by the gate lines 220 and the data lines 270, a plurality of thin film transistors coupled with the pixel electrodes and formed at intersections of the gate lines 220 and the data lines 270, a storage electrode line 230 extending parallel to the gate line 220, and a storage electrode 233 connected to the storage electrode line 230 and extending into the pixel area to overlap with the pixel electrode 290.

The thin film transistor substrate also includes a contact 295 for electrically connecting the storage electrode 230 and the column spacer 150 or 155. The contact 295 may be formed at a pixel boundary to electrically connect adjacent storage electrodes with each other.

The gate line 220 is arranged in a horizontal direction, and a portion of the gate line 220 protrudes to form a gate electrode 223. The data line 270 is arranged in a vertical direction, and a portion of the data line 270 protrudes to form a source electrode 273. The thin film transistor allows the pixel electrode 290 to be charged with a data voltage corresponding to a pixel signal applied from the data line 270 in response to a signal supplied to the gate line 220. The thin film transistor includes the gate electrode 223, the source electrode 273, and a drain electrode 275, which is electrically connected to the pixel electrode 290.

Referring to FIG. 6B, the thin film transistor substrate includes the transparent insulating substrate 210, the gate line 220, the storage electrode 233, the storage electrode line 230, a gate insulating film 240, and the contact 295. The color filter substrate is disposed opposing the thin film transistor substrate and includes the transparent insulating substrate 110, the black matrix 120, the plurality of color filters 130, the overcoat layer 140, the column spacer 150, and the common electrode 160.

The gate line 220 and the storage electrode 233 or storage electrode line 230, spaced by a predetermined interval from the gate line 220, are formed on the transparent insulating substrate 210 of the thin film transistor substrate, and the gate insulating film 240 is formed thereon. A contact hole is formed in the gate insulating film 240 to expose a portion of the storage electrode line 230 or the storage electrode 233, and the contact 295 is formed on the gate insulating film 240 having the contact hole to electrically connect adjacent storage electrodes 233 or storage electrode lines 230 with each other.

Furthermore, the column spacer 150 having the common electrode 160 contacts the contact 295, thereby electrically connecting the common electrode 160 with the storage electrode 233. Further, as noted above, the column spacers 150 may be formed on the substrate at regular intervals in the display area. Thus, since the common electrode 160 of the color filter substrate and the storage electrode 233 of the thin film transistor substrate may be electrically connected with each other through the column spacer 150 and the contact 295, substantially the same common voltage and storage capacitor voltage (i.e., voltages applied to the storage electrode and the storage electrode line) may be applied over the entire surface of the display area on the substrate. As a result, the variation in the common voltage and storage capacitor voltage on the substrate, as well as the variation between the common voltage and the storage capacitor voltage at the center of the substrate, may be minimized. Consequently, the greenish color that may be generated in the display area due to the variation between the common voltage and the storage capacitor voltage at the center of the substrate, as well as other problems that may be generated due to the voltage variation such as flicker and horizontal crosstalk, may be improved or solved.

The LCD panel shown in FIG. 6C differs from the LCD panel shown in FIG. 6B in view of their column spacers 155 and 150 of the color filter substrate. Therefore, the description of the LCD panel of FIG. 6C is omitted.

Figure 7A:
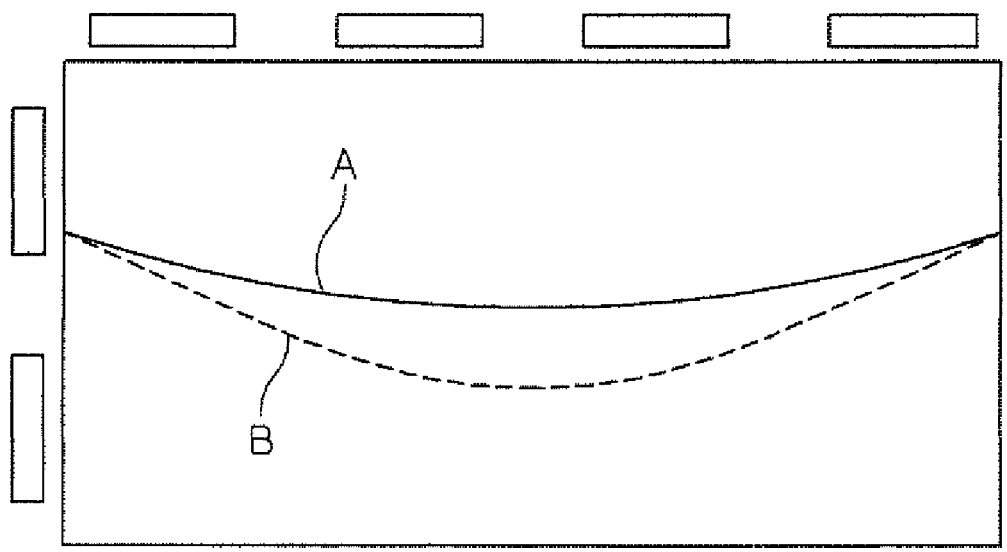
FIG. 7A and FIG. 7B are views showing the distribution of a common voltage of the color filter substrate and of a storage capacitor voltage of the thin film transistor substrate according to the prior art and an exemplary embodiment of the present invention, respectively.
Figure 7B:
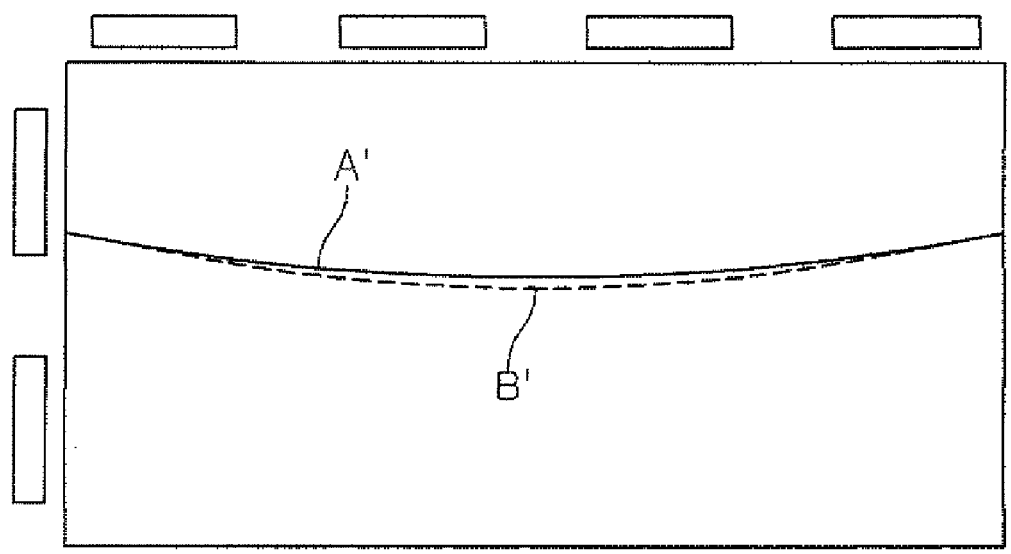

FIG. 7A and FIG. 7B are views showing the distribution of a common voltage of the color filter substrate and a storage capacitor voltage of the thin film transistor substrate according to the prior art and the present invention, respectively.

Referring to FIG. 7A, A denotes the distribution of the common voltage applied to the common electrode of the color filter substrate, and B denotes the distribution of the storage capacitor voltage applied to the storage electrode of the thin film transistor substrate according to the prior art. Referring to FIG. 7B, A' denotes the distribution of the common voltage applied to the common electrode of the color filter substrate, and B' denotes the distribution of the storage capacitor voltage applied to the storage electrode of the thin film transistor substrate according to the present invention.

It may be seen that a relatively large variation exists between the distributions A and B, particularly at the center of the substrate. Conversely, it may be seen that there is relatively little variation between the distributions A' and B', even at the center of the substrate.

Figure 8A:
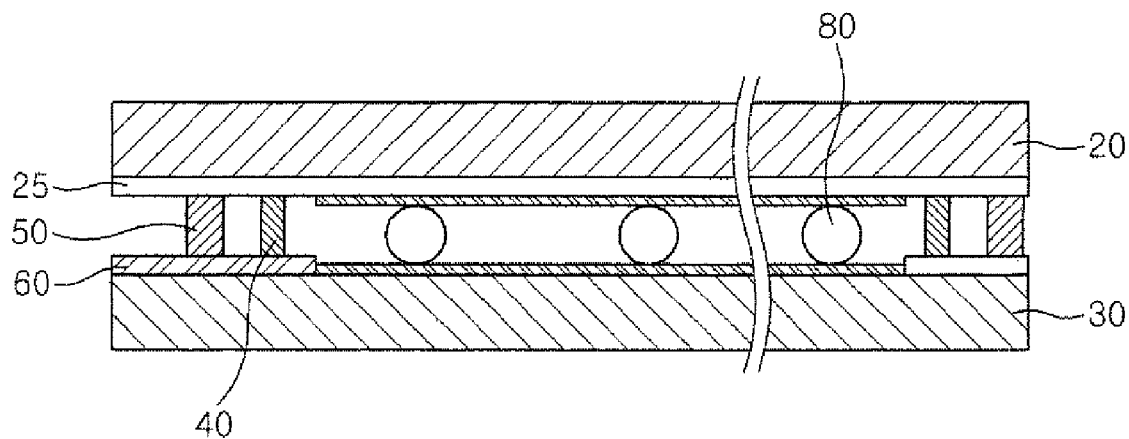
FIG. 8A is a schematic sectional view of an LCD panel having a short according to the prior art.
Figure 8B:
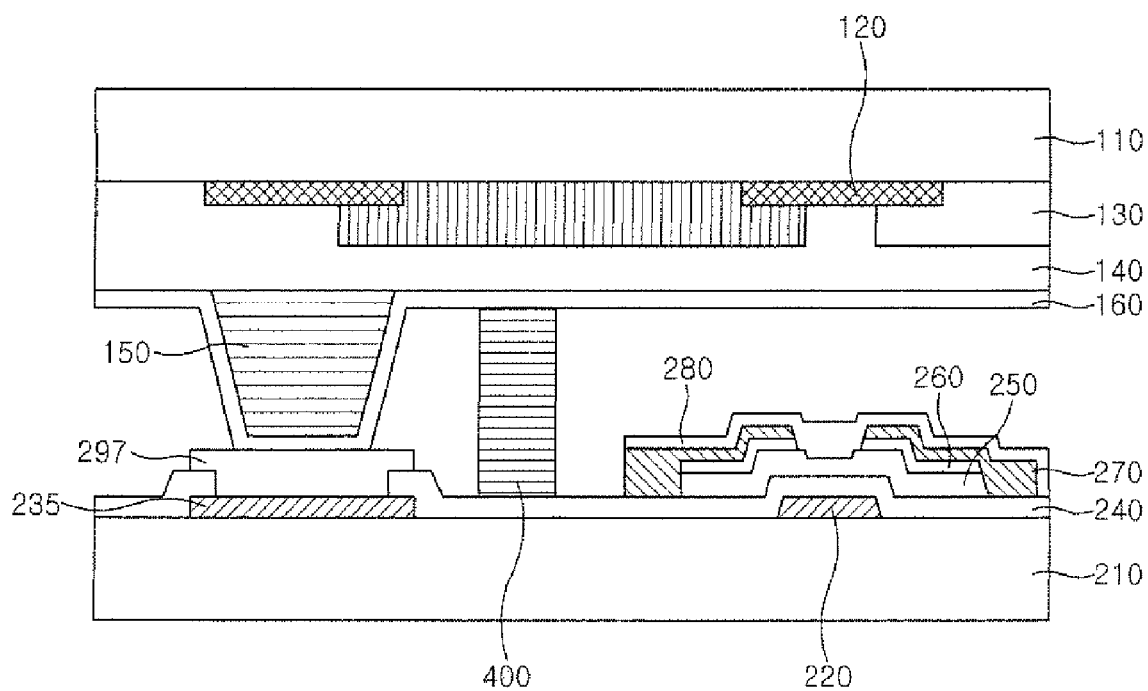
FIG. 8B is a schematic sectional view of an LCD panel according to an exemplary embodiment of the present invention.

FIG. 8A is a schematic sectional view of an LCD panel including a short according to the prior art, and FIG. 8B is a schematic sectional view of an LCD panel according to an exemplary embodiment of the present invention.

Referring to FIG. 8A, the conventional LCD panel may include a thin film transistor substrate 30, a common voltage terminal 60 formed at an end of the thin film transistor substrate 30, a color filter substrate 20, a common electrode 25 formed on the color filter substrate 20, a seal pattern 40 for bonding the thin film transistor substrate 30 and the color filter substrate 20, spacers 80 disposed between the thin film transistor substrate 30 and the color filter substrate 20 to maintain a cell gap of the LCD, and a short 50 for electrically connecting the common voltage terminal 60 with the common electrode 25. The short 50 creates an electrical contact between the common voltage terminal 60 and the common electrode 25 of the color filter substrate 20 to allow voltage to be applied to the common electrode 25.

However, if the short 50 is replaced with a column spacer according to an exemplary embodiment of the present invention, the process of forming the short may be omitted, thereby reducing the material costs thereof. FIG. 8B shows an LCD panel that uses the column spacer 150 or 155 to apply the common voltage to the common electrode of the color filter substrate.

Referring to FIG. 8B, the color filter substrate may include the black matrix 120 formed on the transparent insulating substrate 110, the plurality of color filters 130 formed on the black matrix 120, the overcoat layer 140 formed on the plurality of color filters 130, the column spacer 150 formed on the overcoat layer 140, and the common electrode 160 formed on the overcoat layer 140 and the column spacer 150. In this case, the column spacer 150 is formed at the outer periphery of the substrate, preferably in a non-display area. Here, the non-display area refers to an area in which an image is not displayed when driving the LCD panel.

The thin film transistor substrate includes a thin film transistor serving as a switching element for applying or cutting off a signal voltage to the liquid crystal, a pixel electrode (not shown), and a storage capacitor (not shown) for maintaining the signal voltage applied to the pixel electrode for a predetermined period. A seal pattern 400 is formed on the outer periphery of the substrate to bond the color filter substrate and the thin film transistor substrate together. The thin film transistor comprises a gate line 220 including a gate electrode, a gate insulating film 240, an active layer 250, an ohmic contact layer 260, a source/drain electrode 270, and an insulating film 280.

A common voltage terminal 235 for applying a voltage to the common electrode 160 is formed on the outer periphery of the thin film transistor substrate, and the common voltage terminal 235 and the column spacer 150 may be electrically connected with each other through a contact 297. Alternatively, the contact 297 may be omitted, and the column spacer 150 may contact the common voltage terminal 235. Consequently, the common voltage may be applied to the common electrode 160 by using the column spacer 150 without having to form a separate short.

As described above, according to exemplary embodiments of the present invention, the variation between the common voltage and the storage capacitor voltage at the center of the substrate, as well as the variation in the common voltage and the variation in the storage capacitor voltage across the substrate, may be minimized by forming the conductive column spacer on the color filter substrate and using the conductive column spacer to electrically connect the common electrode with the storage electrode. Therefore, the problems involving a greenish color at the central portion of the display, flicker, and horizontal crosstalk may be solved or mitigated.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
    a first substrate comprising a first conductive column spacer;
    a second substrate opposing the first substrate; and
    a liquid crystal arranged between the first substrate and the second substrate,
    wherein the first conductive column spacer is arranged in a display area of the first substrate, and
    wherein the second substrate comprises:
    a transparent insulating substrate;
    a plurality of storage electrodes arranged on the transparent insulating substrate;
    an insulating film arranged on the storage electrodes and comprising a contact hole exposing a portion of a storage electrode; and
    a contact arranged on adjacent contact holes to electrically connect adjacent storage electrodes with each other, and
    wherein the first column spacer is configured to be connected electrically to the contact.

2. The liquid crystal display panel of claim 1, wherein the first conductive column spacer contacts the contact.

3. The liquid crystal display panel of claim 1, wherein the contact comprises indium tin oxide (ITO) or indium zinc oxide (IZO).

4. The liquid crystal display panel of claim 1, wherein the first substrate further comprises:
    a transparent insulating substrate;
    a black matrix arranged on the transparent insulating substrate;
    a plurality of color filters arranged on the transparent insulating substrate and the black matrix;
    an overcoat layer arranged on the color filters; and
    a common electrode arranged on the overcoat layer and the first conductive column spacer, the first conductive column spacer being arranged between the common electrode and the overcoat layer,
    wherein the first conductive column spacer is arranged on the overcoat layer to maintain a liquid crystal cell gap.

5. The liquid crystal display panel of claim 1, wherein the first substrate further comprises:
    a transparent insulating substrate;
    a black matrix arranged on the transparent insulating substrate;
    a plurality of color filters arranged on the transparent insulating substrate and the black matrix; and
    a common electrode arranged on the color filters, the common electrode being arranged between the first conductive column spacer and the color filters,
    wherein the first conductive column spacer comprises a conductive material and is arranged on the common electrode to maintain a liquid crystal cell gap.

6. The liquid crystal display panel of claim 4, wherein the first conductive column spacer is arranged in an area corresponding to the black matrix.

7. The liquid crystal display panel of claim 6, wherein the first substrate further comprises a second conductive column spacer, the second conductive column spacer being arranged in a non-display area of the first substrate.

8. The liquid crystal display panel of claim 7, wherein the second substrate further comprises a common voltage terminal for applying a voltage to the common electrode of the first substrate.

9. The liquid crystal display panel of claim 8, wherein the common voltage terminal is arranged at an edge of the second substrate and is electrically connected to the second conductive column spacer.

10. The liquid crystal display panel of claim 8, wherein the second substrate further comprises a storage electrode line connected to the storage electrode.

11. The liquid crystal display panel of claim 10, wherein the same voltage is applied to both the storage electrode line and the common voltage terminal.

* * * * *